(12) United States Patent
Gericke et al.

(10) Patent No.: US 6,256,978 B1
(45) Date of Patent: Jul. 10, 2001

(54) POWER GENERATION IN A COMBINATION POWER PLANT WITH A GAS TURBINE AND A STEAM TURBINE

(75) Inventors: Bernd Gericke, Köln; Norbert Faustmann, Berlin; Hans-O. Jeske, Reppenstedt; Ole Hansen, Hamminkeln, all of (DE)

(73) Assignee: GHH Borsig Turbomaschinen GmbH (DE)

( * ) Notice: Subject to any disclaimer, the term of this patent is extended or adjusted under 35 U.S.C. 154(b) by 0 days.

(21) Appl. No.: 09/330,117

(22) Filed: Jun. 10, 1999

(30) Foreign Application Priority Data

Jun. 30, 1998 (DE) .............................. 198 29 088

(51) Int. Cl.[7] ...................................... F02C 6/00
(52) U.S. Cl. ...................................... 60/39.182
(58) Field of Search ................ 60/39.182; 122/7 R, 122/7 B

(56) References Cited

U.S. PATENT DOCUMENTS

| | | | |
|---|---|---|---|
| 4,462,206 | * 7/1984 | Aguet | 60/39.182 |
| 4,729,217 | * 3/1988 | Kehlhofer | 60/39.02 |
| 4,831,817 | * 5/1989 | Linhardt | 60/39.12 |
| 4,891,937 | * 1/1990 | Noguchi et al. | 60/39.182 |
| 4,893,466 | * 1/1990 | Egnell et al. | 60/39.05 |
| 5,052,175 | * 10/1991 | Bruckner | 60/39.463 |
| 5,203,159 | * 4/1993 | Koizumi et al. | 60/39.02 |
| 5,203,160 | * 4/1993 | Ozono | 60/39.02 |
| 5,379,588 | * 1/1995 | Tomlinson et al. | 60/39.182 |
| 5,404,708 | * 4/1995 | Sigling et al. | 60/39.05 |
| 5,706,644 | * 1/1998 | Nielsen | 60/39.02 |
| 5,755,089 | * 5/1998 | Vanselow | 60/39.05 |
| 5,776,413 | * 7/1998 | Kamberger et al. | 60/39.182 |
| 5,799,481 | * 9/1998 | Fetescu | 60/39.02 |
| 5,992,138 | * 11/1999 | Bruckner et al. | 60/39.02 |
| 6,018,942 | * 2/2000 | Liebig | 60/39.182 |

(List continued on next page.)

FOREIGN PATENT DOCUMENTS

| | | |
|---|---|---|
| 38 14 242 | 11/1989 | (DE) . |
| 40 25 527 | 1/1992 | (DE) . |
| 41 29 115 | 3/1993 | (DE) . |
| 43 21 081 | 1/1995 | (DE) . |
| 195 23 062 A1 | 1/1997 | (DE) . |
| 197 34 862 A1 | 2/1999 | (DE) . |

OTHER PUBLICATIONS

Gericke Oct. 1993 Wirkungsgradsteigerung un Hüttenkraftwerken . . . Germany.

Primary Examiner—Timothy S. Thorpe
Assistant Examiner—William H Rodriquez
(74) Attorney, Agent, or Firm—McGlew and Tuttle, P.C.

(57) ABSTRACT

A combination power plant is provided with a gas turbine (1) with generator (28) and with steam generators (2, 10) for a steam turbine (6) with generator (29), wherein the exhaust gas of the gas turbine (1) is fed to a first waste heat boiler (2) with superheaters (23, 24), economizer (3), HP evaporator (22) and auxiliary burner (27), and flue gases of a thermal conversion unit are fed to a second waste heat boiler (10). A high-pressure (HP) evaporator (16) with a supporting tube system (13) and HP steam collecting drum (11), on the one hand, and a low-pressure (LP) evaporator (17) with a supporting tube system (14) and LP steam collecting drum (12), on the other hand, are arranged in the second waste heat boiler (10), through which flue gases flow. The P evaporator (16) is connected via a steam line (21) to the first (23) and second HP steam superheaters (24) arranged in the first waste heat boiler (2). An HP steam collecting drum (5) with surface cooler (46) is arranged upstream of the two HP steam superheaters (23, 24). The HP steam superheater (24) is connected to the steam turbine (6) via an HP steam line (20) and the LP evaporator (17) [is connected to the steam turbine (6)] via an LP steam line (25).

16 Claims, 1 Drawing Sheet

U.S. PATENT DOCUMENTS

| | | | |
|---|---|---|---|
| 6,038,850 | * | 3/2000 | Ohtomo et al. .................. 60/39.182 |
| 6,062,017 | * | 5/2000 | Liebig ............................... 60/39.182 |
| 6,101,982 | * | 8/2000 | Fischer et al. ....................... 122/1 R |
| 6,105,362 | * | 8/2000 | Ohtomo et al. .................. 60/39.182 |
| 6,109,019 | * | 8/2000 | Sigishita .......................... 60/39.182 |
| 6,109,020 | * | 8/2000 | Liebig ............................... 60/39.182 |
| 6,116,017 | * | 9/2000 | Mori et al. ....................... 60/39.182 |
| 6,141,956 | * | 11/2000 | Iilima et al. ..................... 60/39.182 |
| 6,145,295 | * | 11/2000 | Donovan et al. .................. 60/39.02 |
| 6,167,691 | * | 1/2001 | Yoshikawa et al. ................ 60/39.12 |

* cited by examiner

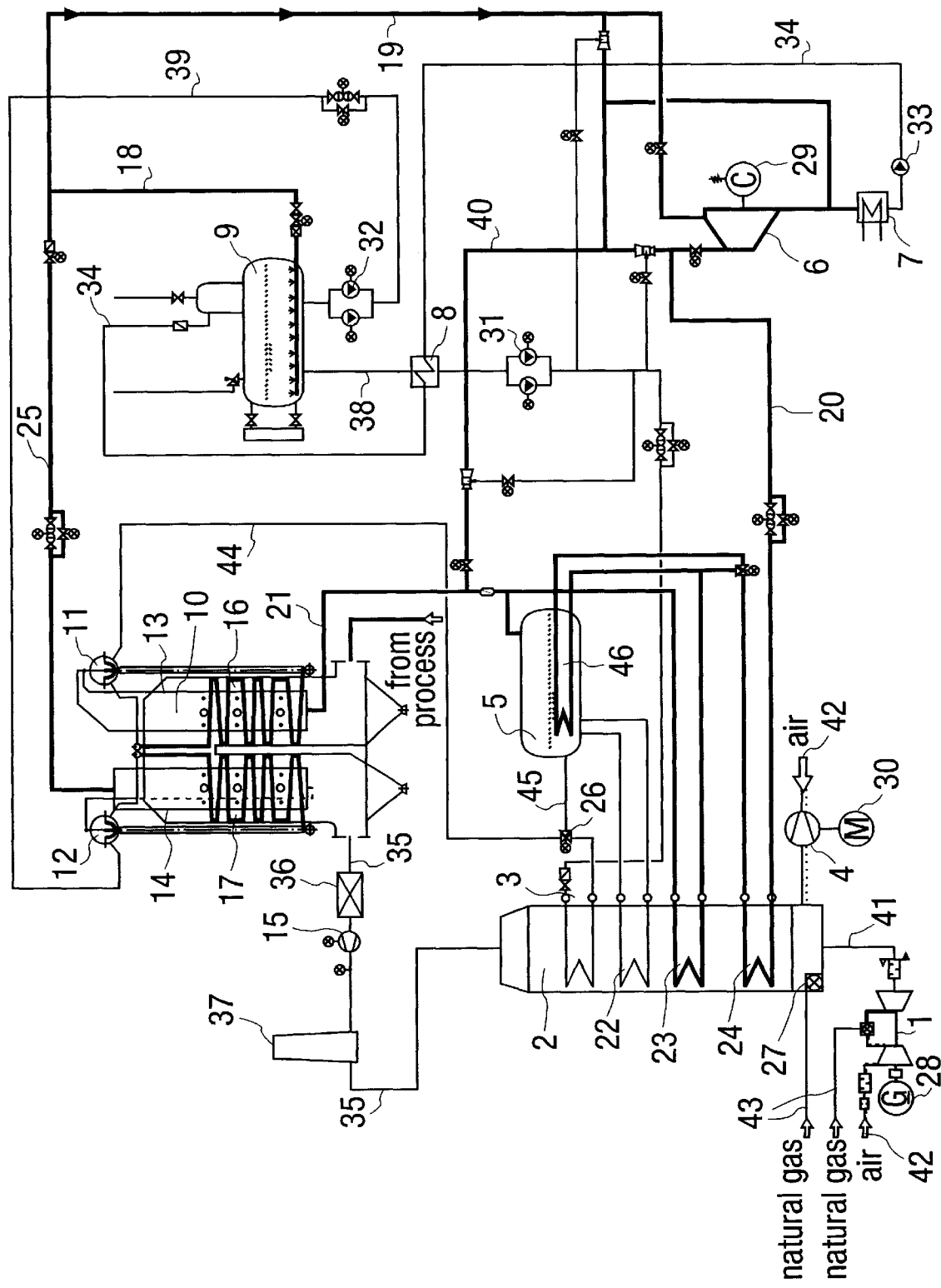

POWER GENERATION IN A COMBINATION POWER PLANT WITH A GAS TURBINE AND A STEAM TURBINE

FIELD OF THE INVENTION

The present invention pertains to a combination power plant with a gas turbine with a generator and with steam generators for a mixed-pressure steam turbine with a generator, wherein the exhaust gas of the gas turbine is fed to a first waste heat boiler with heating surfaces for feed water preheating, steam generation and steam superheating and flue gases of a thermal conversion unit are fed to a second waste heat boiler.

BACKGROUND OF THE INVENTION

The utilization of the low-temperature waste heat of flue gases from thermal conversion processes for power generation has failed hitherto because of the low economic efficiency of the units operating in tandem.

The relatively low exhaust gas temperatures of these waste heat sources, which are subject to great variations due to the process, made possible only low steam parameters before. The electric efficiency of the power generation in a generator in cooperation with a steam turbine was characterized by measures to reach a suitable steam temperature and steam pressure.

A combination power plant with a gas turbine power plant and with a steam power plant has been known from DE 195 23 062 A1.

In this combination power plant with a gas turbine power plant and with a steam power plant, a steam turbine plant is operated with the steam of a steam generator equipped with firing equipment and/or with the steam of a waste heat boiler, through which the exhaust gas of the gas turbine flows. A heat exchanger is provided for the controllable preheating of the compressed combustion air of the gas turbine plant. To operate the combination power plant especially economically even in partial load operation, the heat exchanger for the combustion air of the gas turbine plant is arranged in the flue gas duct of the steam generator and is designed as a recuperator, wherein the flue gas is led around the pipes of the recuperator and the combustion air is led though the pipes of the recuperator. The recuperator is connected via a three-way valve and a bypass to the combustion air line leading from the compressor to the gas burner of the gas turbine plant.

A thermal power plant with a gas turbine and with a steam generator for a multi-pressure steam turbine has been known from the yet unpublished DE 197 34 862.9, wherein the exhaust gas of the gas turbine is fed to a waste heat boiler, which is equipped with auxiliary firing equipment to raise the high pressure (HP) steam output and which contains heat exchangers intended for generating steam. To make it possible to generate steam economically for a multi-pressure steam turbine, especially also at varying loads, three series-connected HP superheater stages with two spray coolers are provided for generating high-pressure steam, and two intermediate-pressure (IP) superheater stages with a spray cooler are provided for generating an intermediate-pressure (IP) steam. The end stages of the HP superheater and IP superheater are arranged in the same section of the waste heat boiler, and their tubes are located alternatingly next to one another in a comb-like pattern. The first IP superheater stage is located between or behind the first two HP superheater stages. A first firing equipment utilizing the exhaust gas of the gas turbine is arranged in the area of the end stages of the superheaters, and a second firing equipment is arranged in front of the HP evaporator, wherein the first firing equipment is controlled as a function of the temperature of the steam at the outlet of the first IP superheater stage, and the second firing equipment is controlled by the HP load in a pressure-dependent manner.

SUMMARY AND OBJECTS OF THE INVENTION

The object of the present invention is to design the power generation in a combination power plant with a gas turbine and steam turbine such that low-temperature waste heat of flue gases from thermal conversion processes, e.g., waste incinerator plants and similar processes are used to generate steam and the entire process is economically better utilized due to the utilization of the waste heat of flue gases.

The low-temperature waste heat of flue gases from thermal conversion processes, e.g., in the manufacture of cement and limestone, iron ore-sintering plants, in steel-making, in waste incineration and other similar processes are first fed according to the present invention into a so-called process waste heat boiler before the flue gases enter a scrubbing stage and then enter the atmosphere in the purified and cooled state.

High heat utilization takes place in the process waste heat boiler due to the installation of a high pressure (HP) evaporator and of a low-pressure (LP) evaporator system.

To avoid condensation, both steam flows are passed over the supporting tubes of the respective evaporator systems and are superheated. This superheated HP steam is mixed via a connection line with the steam generated in the waste heat boiler on the gas turbine exhaust gas side.

The two amounts of steam are superheated together to the desired steam temperature in the superheaters of the gas turbine waste heat boiler, there being at least two superheaters. The superheated steam enters the high-pressure stage of the steam turbine via a connection line.

Via an LP drum and via the connection lines, the LP steam generated in the process waste heat boiler enters the feed water tank, where thermal degassing takes place. The rest of the LP steam enters the LP stage of the steam turbine via a connection line. The flue gas-side pressure losses are overcome by the downstream induced-draft blower integrated within the process.

The feed water preheating takes place in a common economizer at the end of the gas turbine waste heat boiler. The amounts of feed water are split between the respective HP drums via a three-way valve.

The feed water is cooled by the condensate arriving from the condenser by an external water-water heat exchanger to the extent that a very high waste heat utilization is possible in the gas turbine waste heat boiler with the low water inlet temperature now occurring at the HP economizer.

The power generation takes place in the generator of the gas turbine with a DLN combustion chamber and in the generator of the multi-pressure steam turbine.

In the case of failure of the gas turbine, the waste heat boiler operates in the so-called simulated waste heat operation. A fresh air blower then delivers such an amount of air into the waste heat boiler that the same amount of exhaust gas is present as in the case of the gas turbine operation.

Auxiliary burner systems at the inlet of the waste heat boiler now heat the cold air to the extent that the required steam conditions are reached.

The combination power plant according to the present invention combines the waste heat utilization on the process exhaust gas side with a subsequent slight preheating via an HP and LP evaporator.

The full superheating of the steam takes place on the gas turbine exhaust gas side via a superheater divided into two parts as well as an HP evaporator and a common HP economizer. The HP economizer feeds both the HP evaporator on the gas turbine exhaust gas side and the HP evaporator on the flue gas side of the thermal conversion unit. Power generation with a high overall electric efficiency is possible due to high waste heat utilization on the gas turbine exhaust gas side.

Part of the LP steam is used for thermal degassing, the rest being used for power generation, and the steam pressure and the steam temperature are determined extensively by the process gas data.

The drawbacks of prior-art plant circuits arise from the following facts:

Power generation from purely low-temperature waste heat limits the electric efficiency;

An increase in the gas temperature before the waste heat steam generator is achieved by means of auxiliary firing equipment on the flue gas side of the thermal conversion unit, and this increase in the gas temperature leads to the generation of a larger amount of power, but it entails greater energy losses and exhaust gas losses (additional amount of flue gas);

The softening point of the ash is reached in the exhaust gases, which usually contain dust, due to the high output of the auxiliary firing equipment, which may lead to great problems of contamination on the heating surfaces.

The advantages of the combination power plant according to the present invention can be summarized as follows:

By shifting the auxiliary firing equipment into a gas turbine, the electric efficiency increases due to the power generation by the gas turbine, and the high exhaust gas temperature of the gas turbine at the same time makes possible higher hot steam temperature and consequently additionally an increase in the efficiency on the steam turbine side;

High degree of attenuation of the greatly varying amount of steam from the thermal conversion unit (e.g., process-related variations in the exhaust gas temperatures or in the amounts of exhaust gas) due to the steam generator system on the gas turbine exhaust gas side;

The exhaust gas characteristic and the high rotor dynamics of the multishaft gas turbines used for such power plant processes make it possible to maintain the steam temperature permissible for the steam turbine at a constant value within very narrow limits with the corresponding control even in the case of great load changes on the gas turbine;

Autarchic power generation is possible by means of the gas turbine waste heat boiler in the case of failure or down time of the process side (thermal conversion unit);

Flexible power generation by the use of multishaft gas turbines with the electric output adapted to the total steam output to be superheated;

Low NOx levels due to the use of Dry-Low-Nox burners in the gas turbine (e.g., hybrid burners with 13 ppm of NOx);

Expansion of the field of application in the thermal disposal of special waste, where high process temperatures usually prevail with small exhaust gas mass flows at high pollutant load (vanadium, chlorine, and alkalis). High superheating on the flue gas side of the thermal conversion unit is not possible for reasons dictated by the material, as a result of which shifting the superheating to the gas turbine exhaust gas side presents itself as a solution;

The steam parameters are not limited by the process exhaust gas data;

The efficiency potential in power generation is about 60%;

Since process-controlled waste heat is always generated from thermal conversion plants, this heat is considered a thermal energy obtained for free, which is economically utilized.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

In the drawing:

The only FIGURE is a schematic diagram showing the combination power plant system and apparatus and process according to the invention.

DESCRIPTION OF THE PREFERRED EMBODIMENT

Referring to the drawings in particular, the present invention will be explained in greater detail on the basis of a schematic process scheme, wherein the power generation takes place in the generator (28) of the gas turbine (1) and the generator (29) of the steam turbine (6).

The low-temperature waste heat from the thermal conversion unit of a plant, not shown, e.g., a limestone-calcining plant, an ore-sintering plant, a steel mill or awaste incinerator, is sent into a process gas waste heat boiler (10). High heat utilization takes place due to the installation of a high pressure (HP) evaporator (16) and of a low-pressure (LP) evaporator system (17).

To avoid condensation, both steam flows are slightly superheated via the supporting tubes (13) and (14) of the respective evaporator systems (16) and (17). Via the connection line (21), this superheated HP steam is mixed with the steam generated in the gas turbine waste heat boiler (2) by the BP evaporator (22) with the HP drum (5).

Both amounts of steam are superheated to the desired steam temperature in the two superheaters (23 and 24). The superheated steam enters the steam turbine (6) via the connection line (20).

The low-pressure steam generated in the process waste heat boiler (10) is fed via the LP drum (12) and via the connection lines (25) to the feed water tank (9), where thermal degassing is carried out. The residual LP steam is sent to the steam turbine (6) via the connection line (19).

The flue gas-side pressure losses for the process waste heat boiler (10) are overcome without problems by the induced draft blower (15) present, which is integrated within the thermal conversion unit, because the operating temperatures for the blower are lower in waste heat operation.

The feed water preheated is performed in the common economizer (3) on the gas turbine exhaust gas side (2). The amounts of feed water are split between the respective HP drums (5) and (11) via the three-way valve (26).

Due to the external water-water heat exchanger (8), the feed water is cooled by the condensate arriving from the condenser (7) to the extent that very good waste heat utilization is possible in the gas turbine waste heat boiler (2) with the low water inlet temperature now occurring at the HP economizer (3).

As was mentioned, the power generation is performed by a generator (28) of the gas turbine (1) as well as the generator (29) of the steam turbine (6). In the case of failure of the gas turbine (1), the waste heat boiler (2) operates in the so-called simulated waste heat operation. A fresh air blower (4) delivers the same amount of air via the line (42) into the waste heat boiler (2) as in the gas turbine operation. An auxiliary burner (27) now heats the cold air with natural gas (43) to the extent that the required steam conditions for an efficient power generation are reached.

The necessary water supply for the two BP evaporators (16) and (22) in the waste heat boilers (2) and (10) and for the LP evaporator (17) in the waste heat boiler (10) is ensured by two HP feed water pumps (31) and two LP feed water pumps (32) with the lines (38) and (39).

The steam consumed in the steam turbine (6) is obtained as a condensate, which is cooled in a condenser (7) and is fed to the feed water tank (9) by means of a condensate pump (33) through the condensate line (34).

While specific embodiments of the invention have been shown and described in detail to illustrate the application of the principles of the invention, it will be understood that the invention may be embodied otherwise without departing from such principles.

APPENDIX
List of Reference Numbers:

1 Gas turbine
2 Waste heat boiler (gas turbine exhaust gas side)
3 Economizer for feed water preheating
4 Fresh air blower
5 HP steam collecting drum
6 Steam turbine
7 Condenser
8 Water-water heat exchanger
9 Feed water tank
10 Waste heat boiler behind the thermal conversion unit
11 HP steam collecting drum
12 LP steam collecting drum
13 Supporting tubes, HP system
14 Supporting tubes, LP system
15 Induced draft blower
16 High-pressure (HP) evaporator
17 Low-pressure (LP) evaporator
18 LP steam line to 9
19 LP steam line to 6
20 HP steam line
21 HP steam line
22 HP evaporator
23 First HP steam superheater
24 Second HP steam superheater
25 LP steam line to 18 and 19
26 Three-way valve
27 Auxiliary burner
28 Generator at 1
29 Generator at 6
30 Motor of 4
31 LP feed water pumps
32 LP feed water pumps
33 Condensate pump
34 Condensate line
35 Flue gas line
36 Filter (flue gas scrubbing)
37 Exhaust gas flue
38 HP feed water line
39 LP feed water line
40 HP steam line
41 Exhaust gas line from 1
42 Air supply
43 Natural gas line
44 HP feed water line for 11
45 HP feed water line for 5
46 Surface cooler in 5

What is claimed is:

1. A combination power plant with a gas turbine with a generator and with steam generators for a multi-pressure steam turbine with a high pressure portion and a low-pressure portion and being connected to another generator, the combination comprising:

a first waste heat boiler containing a high-pressure economizer, a high-pressure evaporator, a first steam superheater and a second steam superheater;

a gas turbine exhaust fed to said first waste heat boiler;

a second waste heat boiler;

a thermal conversion unit with flue gases of said thermal conversion unit fed to a second waste heat boiler;

a low-pressure evaporator with a supporting tube system;

a low-pressure steam collecting drum, said low-pressure evaporator with said supporting tube system and said low-pressure steam collecting drum being arranged in or associated with said second waste heat boiler through which flue gases flow;

a low-pressure steam line, said low-pressure evaporator being connected to the low-pressure portion of the multi-pressure steam turbine via said low-pressure steam line;

a second waste heat boiler high-pressure evaporator with a supporting tube system, a high-pressure steam collecting drum, said second waste heat boiler high-pressure evaporator and said high pressure steam collecting drum being arranged in or associated with said second waste heat boiler through which flue gases flow, a high-pressure steam line, another steam line, said second waste heat boiler high-pressure evaporator being connected via said another steam line to said first and said second high-pressure steam superheater, said second high-pressure steam superheater being connected to the high-pressure portion of the multi-pressure steam turbine via said high-pressure steam line.

2. The combination power plant in accordance with claim 1, further comprising another high-pressure steam collecting drunk said another high-pressure steam collecting drum having a surface cooler, said surface cooler being arranged between said first and said second high-pressure steam superheater.

3. The combination power plant in accordance with claim 1, wherein said high-pressure economizer is for feed water preheating for said first and second waste heat boilers and is arranged in a colder part of said first waste heat boiler.

4. The combination power plant in accordance with claim 3, further comprising a feed water tank and a high-pressure feed water line, said feed water tank being connected via said feed water line to said high-pressure feed water pumps and to said economizer.

5. The combination power plant in accordance with claim 3, further comprising:
   another high-pressure steam collecting drum arranged upstream of said first and said second high-pressure steam superheater; and
   a first feed water line;
   a second feed water line;
   and a three way valve connected to said first feed water line and said second feed water line, and connected to said economizer wherein said economizer is connected to said high-pressure steam collecting drum of said second waste heat boiler via said first feed water line and to said another steam collecting drum arranged upstream of said first and said second high-pressure steam superheater via said second feed water line, wherein the respective amounts of feed water are split between said waste heat boilers by said three-way valve.

6. The combination power plant in accordance with claim 4, further comprising:
   another high-pressure steam collecting drum arranged upstream of said first and said second high-pressure steam superheater; and
   a first feed water line;
   a second feed water line;
   and a three way valve connected to said first feed water line and said second feed water line, and connected to said economizer wherein said economizer is connected to said high-pressure steam collecting drum of said second waste heat boiler via said first feed water line and to said another high-pressure steam collecting drum arranged upstream of said first and said second high-pressure steam superheater via said second feed water line, wherein the respective amounts of feed water are split between said waste heat boilers by said three-way valve.

7. The combination power plant in accordance with claim 4, further comprising:
   a low-pressure feed water line; and
   low-pressure feed water pumps wherein said feed water tank is connected via said low-pressure feed water line to said low-pressure feed water pumps and to said low-pressure steam collecting drum of the said second waste heat boiler.

8. The combination power plant in accordance with claim 4, further comprising:
   a condensable line;
   a condenser; and
   a condensable pump, wherein the steam turbine and said feed water tank are connected via said condensable line to said condenser and to said condensate pump.

9. The combination power plant in accordance with claim 8, further comprising a water-water heat exchanger, through which said high-pressure feed water line is led, said water-water heat exchanger being arranged in said condensable line.

10. The combination power plant in accordance with claim 1, further comprising a flue gas scrubber and induced draft blower arranged in a flue gas line after said second waste heat boiler.

11. The combination power plant in accordance with claim 10, wherein an exhaust gas flue is arranged in said flue gas line between the said waste heat boilers.

12. The combination power plant in accordance with claim 1, further comprising an auxiliary burner arranged in said exhaust gas line ofthe gas turbine at the inlet of said first waste heat boiler.

13. The combination power plant in accordance with claim 12, wherein said auxiliary burner is connected to said fresh air blower via a line.

14. The combination power plant in accordance with claim 12, wherein the gas turbine and said auxiliary burner are connected to a natural gas line and an oil line, respectively.

15. A gas turbine and mixed-pressure steam turbine system, comprising:
   a gas turbine with a generator and a gas turbine exhaust;
   a mixed-pressure steam turbine with a generator, said mixed-pressure steam turbine having a first portion and a second portion, said first portion operating with fluid at pressure levels higher than fluid pressure levels of said second portion to provide a high-pressure portion and said second portion operating with fluid at pressure levels lower than fluid pressure levels of said first portion to provide a low-pressure portion;
   a first waste heat boiler with a high-pressure part having heating surfaces for feed water preheating, steam generation and including a first steam superheater and a second steam superheater, said gas turbine exhaust being fed to said first waste heat boiler;
   a thermal conversion unit producing flue gases;
   a second waste heat boiler, said flue gases of said thermal conversion unit being fed to said second waste heat boiler, said second waste heat boiler having a high-pressure part and a low-pressure part;
   a low-pressure evaporator with a supporting tube system;
   a low-pressure steam collecting drum, said low-pressure evaporator with said supporting tube system and said low-pressure steam collecting drum being arranged in said second waste heat boiler low-pressure part;
   a high-pressure evaporator with a supporting tube system;
   a high-pressure steam collecting drum, said high-pressure evaporator with said supporting tube system and said high-pressure steam collecting drum being arranged in said second waste heat boiler high-pressure part;
   a steam line connecting said high-pressure evaporator to said first steam superheater and connecting said high-pressure evaporator to said second steam superheater;
   a high-pressure steam line connecting said second high-pressure steam superheater to said steam turbine high-pressure portion; and
   a low-pressure steam line connecting said low-pressure evaporator to said steam turbine low-pressure portion.

16. A gas turbine and mixed-pressure steam turbine system, comprising:
   a thermal conversion unit producing flue gases;
   a gas turbine with a generator and a gas turbine exhaust;
   a first waste heat boiler with a high-pressure part having heating surfaces and including a first steam superheater and a second steam superheater, said gas turbine exhaust being fed to said first waste heat boiler, a second waste heat boiler having a high-pressure part and a low-pressure part, said flue gases of said thermal conversion unit being fed to said second waste heat boiler;

a low-pressure evaporator with a supporting tube system;

a low-pressure steam collecting drum, said low-pressure evaporator with said supporting tube system and said low-pressure steam collecting drum being arranged in said second waste heat boiler low-pressure part;

a high-pressure evaporator with a supporting tube system;

a high-pressure steam collecting drum, said high-pressure evaporator with said supporting tube system and said high-pressure steam collecting drum being arranged in said second waste heat boiler high-pressure part;

a steam line connecting said high-pressure evaporator to said first steam superheater and connecting said high-pressure evaporator to said second steam superheater;

a mixed-pressure steam turbine with a generator, said mixed-pressure steam turbine having a high-pressure portion and a low-pressure portion;

a high-pressure steam line connecting said second high-pressure steam superheater to said steam turbine high-pressure portion; and a low-pressure steam line connecting said low-pressure evaporator to sad steam turbine low-pressure portion.

* * * * *